United States Patent
Sharma et al.

(10) Patent No.: US 10,572,346 B1
(45) Date of Patent: Feb. 25, 2020

(54) DATA INTEGRITY CHECK FOR VM DISASTER RECOVERY USING BACKUP APPLICATION

(71) Applicant: EMC IP Holding Company LLC, Hopkinton, MA (US)

(72) Inventors: Preeti Sharma, Bangalore (IN); Bheemappa Kattikar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 186 days.

(21) Appl. No.: 15/281,347

(22) Filed: Sep. 30, 2016

(51) Int. Cl.
  *G06F 11/00* (2006.01)
  *G06F 11/14* (2006.01)
  *G06F 3/06* (2006.01)
  *G06F 9/455* (2018.01)

(52) U.S. Cl.
  CPC .......... *G06F 11/1448* (2013.01); *G06F 3/065* (2013.01); *G06F 3/067* (2013.01); *G06F 3/0619* (2013.01); *G06F 3/0664* (2013.01); *G06F 9/45533* (2013.01); *G06F 11/1464* (2013.01); *G06F 11/1469* (2013.01)

(58) Field of Classification Search
  CPC .... G06F 11/1448; G06F 3/0619; G06F 3/065; G06F 3/067; G06F 9/45533; G06F 11/1464; G06F 11/1469
  See application file for complete search history.

(56) References Cited

U.S. PATENT DOCUMENTS

| | | | |
|---|---|---|---|
| 7,035,880 B1* | 4/2006 | Crescenti | G06F 11/1464 |
| 8,631,217 B2* | 1/2014 | Basler | G06F 11/1456 |
| | | | 711/162 |
| 9,928,001 B2* | 3/2018 | Dornemann | G06F 3/067 |
| 2008/0016127 A1* | 1/2008 | Field | G06F 11/1458 |
| 2008/0147754 A1* | 6/2008 | Littlefield | G06F 17/302 |
| 2014/0149696 A1* | 5/2014 | Frenkel | G06F 12/16 |
| | | | 711/162 |
| 2015/0317216 A1* | 11/2015 | Hsu | G06F 3/0655 |
| | | | 707/679 |
| 2017/0004047 A1* | 1/2017 | Deshmukh | G06F 11/1448 |

* cited by examiner

*Primary Examiner* — Marc Duncan
*Assistant Examiner* — Jonathan D Gibson
(74) *Attorney, Agent, or Firm* — Anderson Gorecki LLP

(57) ABSTRACT

While performing a backup of a virtual machine running on a host computer, a backup application stores virtual machine data and metadata. The virtual machine can be restored from the backed up virtual machine data, and the backed up virtual machine metadata can be used to check data integrity of the restored virtual machine.

17 Claims, 2 Drawing Sheets

DATA INTEGRITY CHECK FOR VM DISASTER RECOVERY USING BACKUP APPLICATION

BACKGROUND

Aspects of this disclosure are generally related to maintenance of data storage systems that can be used to support hosted applications that utilize relatively large data sets and support a relatively large number of concurrent users. The basic building blocks of a data storage system may include host servers and storage arrays. Hosted applications run on the host servers and utilize the data storage services of the storage arrays. In order to share the processing and memory resources of each host server among multiple instances of the hosted applications the host servers implement container-based or virtual machine-based virtualization. Virtualized servers sometimes become corrupted or are deleted and are subsequently restored.

SUMMARY

All examples, aspects and features mentioned in this document can be combined in any technically possible way.

In accordance with an aspect, an apparatus comprises: a first host computer comprising at least one tangible processor and memory, wherein a hosted application runs on a virtual machine on the first host computer; and a backup computer comprising at least one tangible processor and memory, wherein a backup program runs on the backup computer, the backup program: storing a backup copy of data files of the virtual machine; storing a backup copy of virtual machine metadata; and restoring the virtual machine, thereby creating a restored virtual machine; wherein metadata for the restored virtual machine is generated, thereby creating restored virtual machine metadata, and an integrity check of the restored virtual machine is provided by comparing the backup copy of virtual machine metadata with the restored virtual machine metadata. In some implementations the backup program is configured with multiple backup clients. In some implementations the apparatus comprises a second host computer on which the restored virtual machine is located, and on which the integrity check is performed. In some implementations the metadata for the restored virtual machine comprises one or more of file names, file sizes and file permissions. In some implementations the backup computer comprises non-volatile storage media on which the backup copy of the virtual machine data files and metadata is stored. In some implementations the apparatus comprises a recovery request in response to which the virtual machine is restored. In some implementations the virtual machine is restored using the backup copy of the virtual machine data files. In some implementations the apparatus comprises a virtual network appliance running on a virtual machine on the first host computer on which the restored virtual machine is located, the virtual network appliance providing an integrity check of the restored virtual machine by comparing the backup copy of virtual machine metadata with the restored virtual machine metadata. In some implementations the hosted application is loaded on the restored virtual machine in response to an indication of restored virtual machine data integrity.

In accordance with an aspect a method comprises: in a network comprising a first host computer comprising a hosted application that runs on a virtual machine on the first host computer: storing a backup copy of data files of the virtual machine; storing a backup copy of virtual machine metadata; restoring the virtual machine, thereby creating a restored virtual machine; generating metadata for the restored virtual machine, thereby creating restored virtual machine metadata; and performing an integrity check of the restored virtual machine by comparing the backup copy of virtual machine metadata with the restored virtual machine metadata. Some implementations comprise configuring the backup program with multiple backup clients. Some implementations comprise performing the integrity check on a second host computer on which the restored virtual machine is located. Some implementations comprise generating metadata for the restored virtual machine by generating one or more of file names, file sizes and file permissions. Some implementations comprise storing the backup copy of the virtual machine data files and metadata on non-volatile storage associated with a backup computer. Some implementations comprise restoring the virtual machine in response to a recovery request. Some implementations comprise restoring the virtual machine using the backup copy of the virtual machine data files. Some implementations comprise, wherein a virtual network appliance runs on a virtual machine on the first host computer on which the restored virtual machine is located, the virtual network appliance providing an integrity check of the restored virtual machine by comparing the backup copy of virtual machine metadata with the restored virtual machine metadata. Some implementations comprise loading the hosted application on the restored virtual machine in response to an indication of restored virtual machine data integrity.

In accordance with an aspect an apparatus comprises program code stored on a non-transitory computer-readable medium comprising: first storing instructions that store a backup copy of data files of a virtual machine; second storing instructions that store a backup copy of virtual machine metadata; restoring instructions that create a restored virtual machine from the virtual machine data files; and integrity checking instructions that generate metadata for the restored virtual machine, thereby creating restored virtual machine metadata, and compare the backup copy of virtual machine metadata with the restored virtual machine metadata. Some implementations comprise loading instructions that load a hosted application on the restored virtual machine in response to an indication of restored virtual machine data integrity.

DETAILED DESCRIPTION

Some aspects, features and implementations described herein, including but not limited to data storage devices, computing devices, electronic components, optical components, and computer-implemented steps, may include machines and processes that are part of a complex system. Not every subsystem that may be part of such a complex system is necessarily described herein. Those of ordinary skill in the art will recognize such subsystems in view of the teachings of the present disclosure and the knowledge generally available to those of ordinary skill in the art. It will also be apparent to those of ordinary skill in the art that computer-implemented steps are stored as computer-executable instructions on a non-transitory computer-readable medium and executed on any of a variety of tangible processor devices. The machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features. For example, multiple virtual computing devices could operate simultaneously on one physical computing device. It will therefore be understood that virtual features are associated with physical features. Further, computer programs require tangible processing resources in order to function, and general purpose processing resources require computer programs in order to function. The term "logic" is used to refer to special purpose physical circuit elements and software instructions that are stored on a non-transitory computer-readable medium and implemented by general purpose tangible processors.

Figure 1:
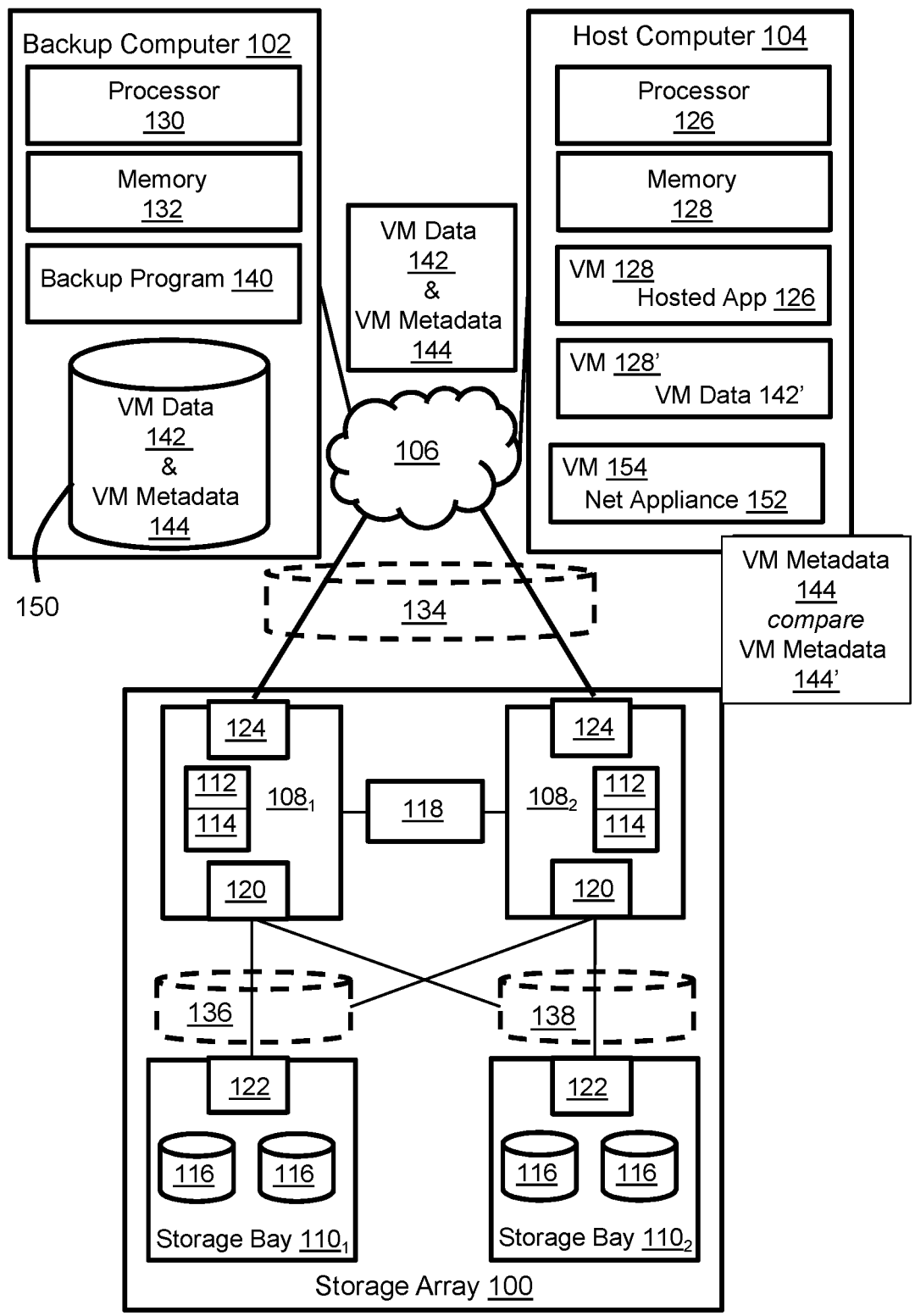
FIG. 1 illustrates an exemplary data storage system in which virtual machine metadata stored by a backup computer is used to verify the integrity of a restored virtual machine.

FIG. 1 illustrates an exemplary data storage system that includes a storage array 100, a backup computer 102 and a host computer 104. Any number of storage arrays, host computers and backup computers could be included in the data storage system. The backup computer 102, host computer 104 and storage array 100 are interconnected via a communications network 106. The communications network 106 may include various network nodes, e.g. switches, routers, hubs, and other network devices. For context and without limitation the network 106 may include one or more of a WAN (wide area network), MAN (metropolitan area network) and LAN (local area network). The host computer 104 is a tangible computing device with a processor 126 and memory 128. The processor may include multiple processing cores and the memory may include RAM (random access memory). The backup computer 102 is also a tangible computing device with a processor 130 and memory 132 that may include multiple processing cores and RAM, respectively.

The storage array 100 includes multiple interconnected computing nodes $108_1$-$108_2$, each of which may be associated with one of multiple storage bays $110_1$-$110_2$. Although the illustrated storage array includes only two computing nodes, any number of computing nodes could be included in the storage array. The computing nodes may include "vanilla" storage servers and specialized hardware platforms including but not limited to storage directors and storage engines. Each computing node includes a multi-core processor 112 and memory 114, e.g. and without limitation RAM. The storage bays $110_1$-$110_2$ include managed drives 116, of which there may be many. The managed drives are tangible data storage components of one or more technology types, e.g. and without limitation SSDs (solid state devices, e.g. flash) and HDDs (hard disk drives). Each computing node is connected to every other computing node in the storage array via point-to-point links of an interconnecting component 118 such as a fabric, switch or router, for example and without limitation. Each computing node includes a back-end adapter 120 that interfaces with a disk controller 122 of the associated storage bay. The storage array 100 interfaces with the network 106 via front-end adapters 124 of the computing nodes.

The host computer 104 runs instances of one or more hosted applications, one of which is hosted application 126. Examples of hosted applications that may include but are not limited to one or more of a database, file server and block server. Hosted application 126 operates on a virtualized host server, of which there may be many on host computer 104. The virtualized host server may be implemented as a container or VM (virtual machine) 128. For example, containers may operate on a host computer OS (operating system) or a hypervisor program may be associated with multiple VMs that are instantiated on the host computer. A hypervisor with VMs will be described hereafter and the terms VM and virtual machine are used herein to refer to both native and hosted virtualization. The hypervisor and VMs help to apportion processing and memory resources of the host computer to the hosted applications. For example and without limitation, a VM may provide the hosted application running therein with access to only a certain amount or set of addresses of memory 128 and cores of processor 126. The data that is used by the hosted application is maintained by the storage array 100, although active data may be maintained locally on host computer memory. From the perspective of the host computer 104, the data used by the hosted application 126 is maintained on a storage device 134 that can be accessed by IOs.

Storage device 134 is a logical device that the computing nodes of the storage array present to the host computer 104. The logical storage device 134 may be referred to as a device, logical volume, production volume or production LUN (logical unit number), in accordance with the SCSI (small computer system interface) protocol. The logical device 134 is backed by the managed drives 116 of the storage bays. In other words, the logical device is mapped to one or more tangible storage components that are capable of storing data, and thus represents an abstraction layer. From the perspective of the host computer 104 the logical device 134 is a single real data storage device having a set of contiguous fixed-size LBAs (logical block addresses) on which data used by the host application 126 resides, as described by host metadata. However, the data used by the host application may actually be maintained by the computing nodes at non-contiguous addresses on various different managed drives. The storage array maintains metadata indicative of the locations of extents of data on the managed drives. Consequently, the computing nodes can use the metadata maintained in the storage array to determine the actual location of data on the managed drives based on a reference to the logical device 134 in an IO from the host computer 104 based on host-maintained metadata. While not necessary for an understanding the inventive concepts, the managed drives may be organized into logical devices 136, 138 such as storage resource pools and storage groups that may be used to provide differentiated performance to different hosted applications.

It is sometimes necessary or desirable to restore aVM that is corrupted or deleted from the host computer 104. For example and without limitation, if VM 128 is corrupted or deleted from the associated host computer 104 then it may be necessary or desirable to restore that VM 128. In order to enable restoration of a VM the backup computer stores VM data 142 from which the VM 128 can be recreated. The VM 128 may be restored to the same host computer 104 on which it was running before being corrupted or deleted, or restored to a different host computer depending on circumstances. For example, the VM might be restored to the same host computer in response to a temporally brief problem and reboot, or restored to a different host computer in response to a catastrophic failure, although these examples should not be viewed as limiting. Regardless of where the VM is to be restored, the restoration process requires transmission of backup VM data across the network and processing of that data on a host computer. It is therefore desirable to have an indication of VM integrity following restoration. As will be explained in greater detail below, VM metadata 144 may be used to verify restored VM integrity.

Figure 2:
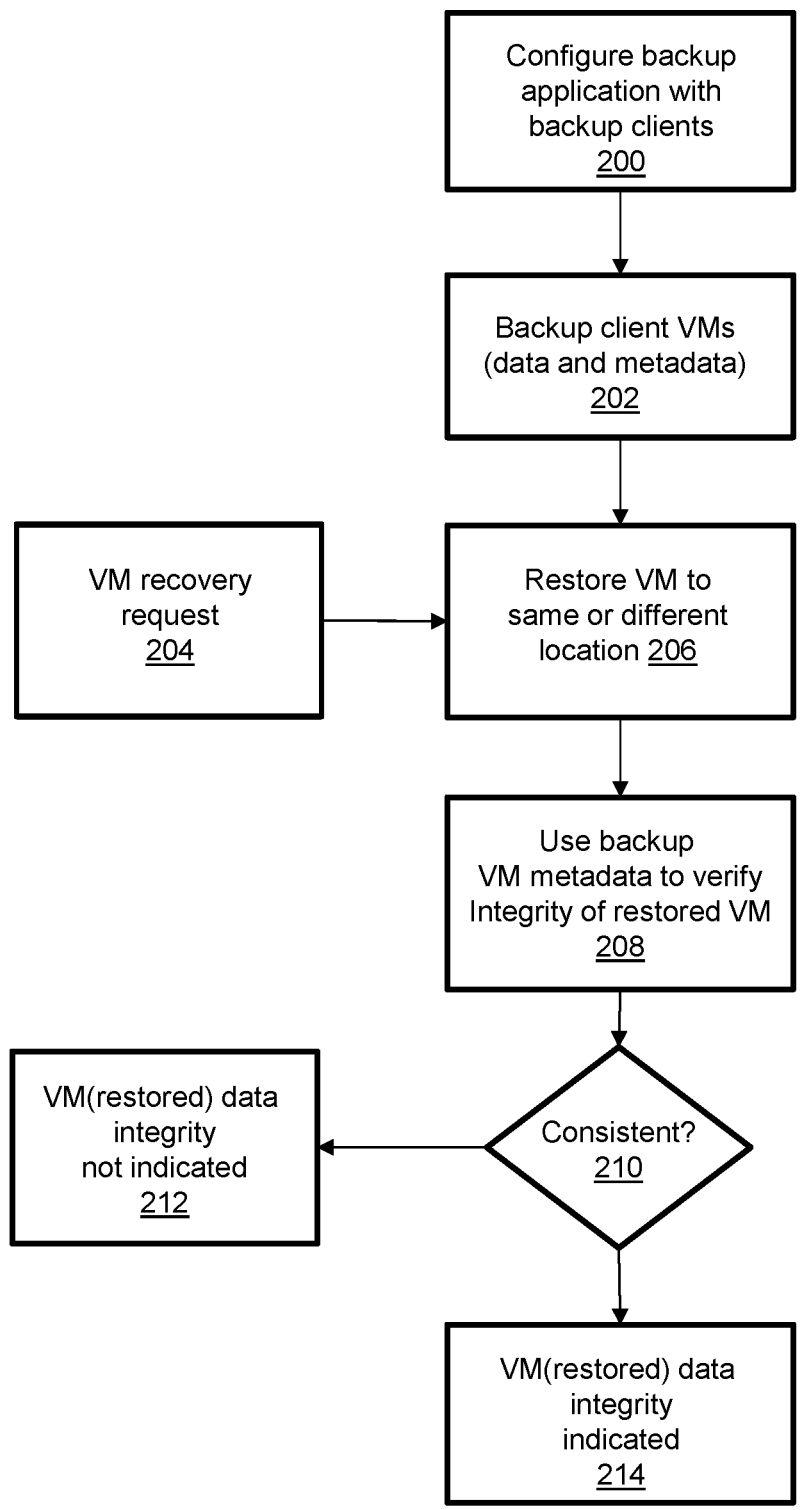
FIG. 2 illustrates operation of a program that provides virtual machine restoration with integrity verification.

Referring now to FIGS. 1 and 2, the backup computer 102 runs a backup program 140 that provides VM backup and restoration services with a restored VM integrity check. As indicated in block 200, as an initial action the backup program 140 is configured with backup clients. For example and without limitation, backup program 140 may be configured to provide backup and restoration services for backup client VM 128, all backup client VMs running on host computer 104, or a collection of various backup client VMs running on a variety of host computers. As indicated in block 202 the backup program 140 backs up the backup client VMs (including VM 128) for which the backup program has been configured. The backup process may include storing both VM data 142 and VM metadata 144. The VM data includes the contents of various VM files (programs and data). The VM metadata includes information about the VM files, e.g. file names, file sizes and file permissions, for example and without limitation. Consequently, the VM metadata is generated from the VM data. The VM metadata may be generated on the host computer 104 or the backup computer 102. The VM data 142 and VM metadata 144 may be stored by the host computer in non-volatile storage 150 such as SSDs or HDDs associated with the backup computer 102.

Any of a variety of situations including but not limited to host computer 104 failure may trigger generation of a VM recovery request as indicated in block 204. In response to the VM recovery request the backup program 140 prompts restoration of the deleted or corrupted VM using the VM data 142 obtained and stored during the backup process (block 202). As previously mentioned, the VM may be restored to the same location or to a different location, e.g. to the same or different host computer. In the illustrated example the deleted or corrupted VM 128 is restored as VM 128' and the associated restored VM data 142' corresponds to VM data 142. Once the VM has been restored the backup program 140, or some other program such as a virtual network appliance 152 running on a VM 154 on the host computer 104, verifies the integrity of the restored VM 128' by using the backup metadata 144 as indicated in block 208. For example, the backup VM metadata 144 maintained by the backup computer in storage 150 may be sent to the host computer 104 and compared with VM metadata 144' generated from restored VM data 142' on the host computer. If the backup metadata 144 is consistent with the restored VM metadata 144' as determined in block 210 then restored VM 128' data integrity is indicated as shown in block 214. If the backup metadata 144 is inconsistent with the restored VM metadata 144' as determined in block 210 then restored VM data integrity is not indicated as shown in block 212. If data integrity is indicated then the hosted application 126 can be loaded onto the restored VM 128'.

A number of features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:
  a first host computer comprising at least one tangible processor and memory, wherein a first instance of a hosted application runs on a first virtual machine on the first host computer; and
  a backup computer comprising at least one tangible processor and memory, wherein a backup program runs on the backup computer, the backup program:
    storing a backup copy of data files of the first virtual machine;
    storing a backup copy of first virtual machine metadata; and
    providing the data files of the first virtual machine and the first virtual machine metadata to the first host computer responsive to a recovery request;
  the first host computer:
    restoring the first virtual machine, thereby creating a restored first virtual machine;
    generating metadata for the restored first virtual machine, thereby creating restored first virtual machine metadata;
    performing an integrity check of the restored first virtual machine by comparing the backup copy of first virtual machine metadata provided by the backup computer with the restored first virtual machine metadata generated by the first host computer; and
    loading the hosted application on the restored first virtual machine in response to an indication of restored first virtual machine data integrity as indicated by the integrity check.

2. The apparatus of claim 1 wherein the backup program is configured with multiple backup clients.

3. The apparatus of claim 1 comprising a second host computer on which a second instance of the hosted application runs on a second virtual machine,
  the backup program:
    storing a backup copy of data files of the second virtual machine;
    storing a backup copy of second virtual machine metadata; and
    providing the data files of the second virtual machine and the second virtual machine metadata to the second host computer responsive to a different recovery request;
  the second host computer:
    restoring the second virtual machine from the data files of the second virtual machine provided by the backup computer, thereby creating a restored second virtual machine;
    generating metadata for the restored second virtual machine, thereby creating restored second virtual machine metadata;
    performing an integrity check of the restored second virtual machine by comparing the backup copy of second virtual machine metadata provided by the backup computer with the restored second virtual machine metadata; and
    loading the hosted application on the restored second virtual machine in response to an indication of restored second virtual machine data integrity as indicated by the integrity check.

4. The apparatus of claim 1 wherein the metadata for the restored first virtual machine comprises one or more of file names, file sizes and file permissions.

5. The apparatus of claim 1 wherein the backup computer comprises non-volatile storage media on which the backup copy of the first virtual machine data files and metadata is stored.

6. The apparatus of claim 3 comprising a virtual network appliance running on a third virtual machine on the second host computer on which the restored second virtual machine is located, the virtual network appliance performing the integrity check of the restored second virtual machine.

7. The apparatus of claim 1 comprising the first host computer restoring the first virtual machine using the backup copy of the first virtual machine data files provided by the backup computer.

8. The apparatus of claim 1 comprising a virtual network appliance running on a third virtual machine on the first host computer on which the restored first virtual machine is located, the virtual network appliance performing the integrity check of the restored first virtual machine.

9. A method comprising:
   in a network comprising a backup computer and a first host computer comprising a first instance of a hosted application that runs on a first virtual machine on the first host computer:
      storing a backup copy of data files of the first virtual machine on storage associated with the backup computer;
      storing a backup copy of first virtual machine metadata on storage associated with the backup computer;
      providing the data files of the first virtual machine and the first virtual machine metadata to the first host computer responsive to a recovery request;
      restoring the first virtual machine on the first host computer, thereby creating a restored first virtual machine;
      the first host computer generating metadata for the restored first virtual machine, thereby creating restored virtual first machine metadata;
      performing an integrity check of the restored first virtual machine by comparing the backup copy of first virtual machine metadata provided by the backup computer with the restored first virtual machine metadata generated by the first host computer; and
      loading the hosted application on the restored first virtual machine in response to an indication of restored first virtual machine data integrity as indicated by the integrity check.

10. The method of claim 9 comprising configuring the backup program with multiple backup clients.

11. The method of claim 9 comprising a second host computer on which a second instance of the hosted application runs on a second virtual machine, and comprising the steps of:
   the backup computer storing a backup copy of data files of the second virtual machine;
   the backup computer storing a backup copy of second virtual machine metadata; and
   the backup computer providing the data files of the second virtual machine and the second virtual machine metadata to the second host computer responsive to a different recovery request;
   the second host computer restoring the second virtual machine from the data files of the second virtual machine provided by the backup computer, thereby creating a restored second virtual machine;
   the second host computer generating metadata for the restored second virtual machine, thereby creating restored second virtual machine metadata;
   the second host computer performing an integrity check of the restored second virtual machine by comparing the backup copy of second virtual machine metadata provided by the backup computer with the restored second virtual machine metadata; and
   the second host computer loading the hosted application on the restored second virtual machine in response to an indication of restored second virtual machine data integrity as indicated by the integrity check.

12. The method of claim 9 wherein generating metadata for the restored first virtual machine comprises generating one or more of file names, file sizes and file permissions.

13. The method of claim 12 comprising running a virtual network appliance on a third virtual machine on the second host computer on which the restored second virtual machine is located, the virtual network appliance performing the integrity check of the restored second virtual machine.

14. The method of claim 9 comprising storing the backup copy of the first virtual machine data files and metadata on non-volatile storage associated with a backup program.

15. The method of claim 9 comprising the first host computer restoring the first virtual machine using the backup copy of the first virtual machine data files provided by the backup computer.

16. The method of claim 9 wherein a virtual network appliance runs on a third virtual machine on the first host computer on which the restored first virtual machine is located, and comprising the virtual network appliance performing the integrity check of the restored first virtual machine.

17. An apparatus comprising:
   program code stored on a non-transitory computer-readable medium comprising:
      first storing instructions that store a backup copy of data files of a first virtual machine running on a first host computer on storage associated with a backup computer;
      second storing instructions that store a backup copy of first virtual machine metadata on storage associated with a backup computer;
      first restoring instructions that provide the data files of the first virtual machine and the first virtual machine metadata from the backup computer to a second host computer responsive to a recovery request;
      second restoring instructions that create a restored first virtual machine on the second host computer from the virtual machine data files provided by the first restoring instructions;
      integrity checking instructions that generate metadata for the restored first virtual machine on the second host computer, thereby creating restored first virtual machine metadata, compare the backup copy of first virtual machine metadata with the restored first virtual machine metadata; and
      loading instructions on the second host computer that load a hosted application on the restored first virtual machine in response to an indication of restored first virtual machine data integrity as indicated by the integrity check.

\* \* \* \* \*